(12) United States Patent
Chen et al.

(10) Patent No.: US 8,744,782 B2
(45) Date of Patent: Jun. 3, 2014

(54) SYSTEM AND METHOD FOR SIMULTANEOUSLY DETERMINING STRAIN AND TEMPERATURE CHARACTERISTICS OF AN OBJECT

(75) Inventors: Xin Chen, Corning, NY (US); Ming-Jun Li, Horseheads, NY (US); Anping Liu, Big Flats, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 650 days.

(21) Appl. No.: 12/947,066

(22) Filed: Nov. 16, 2010

(65) Prior Publication Data

US 2012/0123702 A1 May 17, 2012

(51) Int. Cl.
*G01L 11/02* (2006.01)
*G01L 11/00* (2006.01)
*G01K 11/00* (2006.01)
*G01K 11/20* (2006.01)

(52) U.S. Cl.
USPC .................. 702/42; 702/41; 702/94; 702/99

(58) Field of Classification Search
USPC ............ 702/41, 42, 69, 72, 89, 94, 99, 183, 702/189; 356/301; 374/130; 385/123; 398/108
See application file for complete search history.

(56) References Cited

U.S. PATENT DOCUMENTS 6,959,135 B1 * 10/2005 Bickham et al. ............. 385/123
7,284,903 B2 * 10/2007 Hartog ......................... 374/130
7,397,976 B2 * 7/2008 Mendez et al. ............... 385/12
7,480,460 B2 * 1/2009 Colpitts et al. ............... 398/108
8,115,919 B2 * 2/2012 Yun et al. ..................... 356/301

OTHER PUBLICATIONS

"Comparison of the methods for discriminating temperature and strain in spontaneous Brillouin-based distributed sensors"; Alahbabi et al; Optics Letters; vol. 29, No. 1; Jan. 1, 2004; p. 26-28.
"Effects of bending on the performance of hole-assisted single polarization fibers"; Chen et al; Optics Express; Aug. 20, 2007; vol. 15, No. 17; p. 10629-10636.
"Al/Ge co-doped large mode area fiber with high SBS threshold"; Li et al; Optics Express; Jun. 25, 2007; vol. 15; No. 13; p. 8290-8299.
"Brillouin gain analysis for fibers with different refractive indices"; Ruffin et al; Optics Letters; vol. 39; No. 23; Dec. 1, 2005; p. 3123-3125.
"Strain dependence of Brillouin frequency, intensity, and bandwidth in polarization-maintaining fibers"; Yu et al; Optics Letters; Jul. 15, 2004; vol. 29; No. 14; p. 1605-1607.

* cited by examiner

*Primary Examiner* — Sujoy Kundu
*Assistant Examiner* — Felix Suarez
(74) *Attorney, Agent, or Firm* — Svetlana Short (57) ABSTRACT

A system for simultaneously determining strain and temperature characteristics of an object comprising: (i) at least one optical fiber having at least two Brillouin peaks; (ii) at least one connector securing the optical fiber to the object to be monitored; (iii) a laser positioned to provide laser light to said at least one optical fiber; (iv) a device measuring frequencies of said at least two Brillouin peaks, and determining frequency shifts of said at least two Brillouin peaks for said at least one optical fiber along the length of fiber; and (v) a system calculating strain and temperature characteristics along said fiber, based on the coefficients of strain and temperature as well as the measured Brillouin frequency shifts for said optical fiber along the length of said optical fiber.

25 Claims, 7 Drawing Sheets

SYSTEM AND METHOD FOR SIMULTANEOUSLY DETERMINING STRAIN AND TEMPERATURE CHARACTERISTICS OF AN OBJECT

BACKGROUND

The disclosure relates generally to a method and a system for the simultaneous measurement of strain and temperature utilizing principles associated with Brillouin scattering, and more particularly to a method and a system for the simultaneous measurement of strain and temperature by utilizing a fiber with two Brillouin peaks.

Brillouin scattering can be used to measure strain or temperature in an optical fiber. It has been known that because there is only one peak of a Brillouin spectrum from a single mode fiber (e.g., SMF-28$^R$ fiber available from Corning Incorporated) and because strain and temperature change simultaneously, it is impossible to simultaneously extract information respecting both strain and temperature from a single peak of the Brillouin spectrum.

In the past, it has been necessary to take special measures to determine simultaneously both strain and temperature. For example, if the temperature is maintained constant it is possible to measure strain, or if the strain is maintained constant it is possible to measure temperature. Another approach would be to install an additional fiber for temperature measurement in order to compensate for the temperature influence on the Brillouin spectrum caused by both temperature and strain. For example, some systems utilize at least two optical fibers, coupled to one another with a proper optical coupling mechanism.

No admission is made that any reference cited herein constitutes prior art. Applicant expressly reserves the right to challenge the accuracy and pertinency of any cited documents.

SUMMARY

One embodiment of the disclosure relates to a method of simultaneously determining strain and temperature characteristics of an object comprising the steps of: (i) providing at least one optical fiber having at least two Brillouin peaks, (ii) determining coefficients of strain and temperature for the at least one optical fiber; (iii) securing the at least one optical fiber to said object along a length thereof; (iv) inputting laser light into the at least one optical fiber at one other end thereof, (v) measuring the at least two Brillouin peak frequencies for the at least one optical fiber; and (vi) calculating strain and temperature characteristics based on the coefficients of strain and temperature and the measured Brillouin frequencies for the at least one optical fiber. At least some embodiments utilize a single optical fiber as a sensing fiber (i.e., no other fibers of different geometry, different refractive index profile, and/or different composition are used as sensing fibers). According to some embodiments, laser light from a single laser having single-longitudinal mode is directed to and is coupled into one end of the single optical fiber with at least two Brillouin peaks.

An additional embodiment of the disclosure relates to a system for simultaneously determining strain and temperature characteristics of an object, the system comprising: (i) at least one optical fiber having at least two Brillouin peaks; (ii) at least one connector securing the at least one optical fiber to the object to be monitored; (iii) a laser positioned to provide laser light to the optical fiber; (iv) a device measuring frequencies of the at least two Brillouin peaks, and determining frequency shifts the at least two Brillouin peaks for the optical fiber; and (v) a system calculating strain and temperature characteristics along the optical fiber, based on the coefficients of strain and temperature as well as the measured Brillouin frequency shifts for the optical fiber.

Preferably the amplitude $A_1$ of at the least one of the Brillouin peaks is within 50% to 150% of the amplitude $A_2$ of another Brillouin peak of the fiber, such that $0.5 A_2 \leq A_1 \leq 1.5 A_2$. According to some embodiments $0.6 A_2 \leq A_1 \leq 1.4 A_2$. For example, $0.7 A_2 \leq A_1 \leq 1.3 A_2$, $0.75 A_2 \leq A_1 \leq 1.25 A_2$; $0.8 A_2 \leq A_1 \leq 1.2 A_2$; and $0.9 A_2 \leq A_1 \leq 1.1 A_2$.

According to some embodiments the optical fiber (sensing fiber) has birefringence of at least $10^{-4}$ at the operating wavelength. According to some embodiments the fiber has birefringence of at least $3 \times 10^{-4}$, or even greater than $5 \times 10^{-4}$ at the operating wavelength. The operating wavelength may be, for example, 1550 nm, 1310 nm, 1060 nm, or 850 nm.

According to some embodiments the fiber's effective area Aeff is less than 70 μm$^2$, for example, 40 μm$^2$ to 70 μm$^2$, or 40 μm$^2$ to 65 μm$^2$ According to some embodiments the fiber includes a silica based core doped with at least two of: Ge, Al, B.

According to some embodiments the fiber is bending insensitive such that bend loss is less than 1 dB/turn at 5 mm bend radius (for example less than 0.5 dB/turn at 5 mm bend radius), and preferably less than 0.2 dB/turn at 5 mm bend radius, and more preferably less than 0.1 dB/turn at 5 mm bend radius.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference is now made in detail to the present preferred embodiments of the invention, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Definitions

In the description of the invention below, the following terms and phrases are used in connection to optical fiber.

The "refractive index profile" or refractive index delta profile is the relationship between the refractive index or the relative refractive index and the waveguide (fiber) radius.

The "relative refractive index percent" or "refractive index delta" is defined as $\Delta(r)\% = 100 \times [n(r)^2 - n_{REF}^2)]/2n(r)^2$, where n(r) is the refractive index at radius r, unless otherwise specified. The relative refractive index percent is defined at 850 nm unless otherwise specified. In one aspect, the reference index $n_{REF}$ is silica glass with the refractive index of 1.453317 at 850 nm, in another aspect is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

Likewise, one or more other dopants which are not downdopants may be present in a region of an optical fiber having a negative relative refractive index.

The term "α-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The term "nano-structured fiber region" describes the fiber having a region or area with a large number (>than 50) of gas filled voids, or other nano-sized structures, e.g., more than 50, more than 100 or more than 200 voids or other nano-sized structures in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) may vary from 10 nm to 1 μm (for example, 50 nm-500 nm), and the length may vary from 1 millimeter 50 meters (e.g., 2 mm to 5 meters, or 5 mm to 1 m range).

Sensor System, Method for Sensing, Sensing Fiber, and Attributes

Optical fiber has a capability for continuously monitoring the overall condition of civil engineering structures, which is done by attaching the fiber to a structure that is being monitored, and measuring distributed strain and temperature along the fiber. The advantages of using optical fiber include the capability of sensing both temperature and strain distributions over a long distance, and that the fiber can be easily imbedded into a variety of structures because optical fiber is flexible, small in diameter, and light in weight.

When a laser pulse (with the wavelength $\lambda_1$) is propagating along an optical fiber, light is backscattered due to interaction between optical and acoustic waves. This kind of scattering is called Brillouin scattering. The backscattered light has a slightly different frequency than the original signal (and thus has the wavelength $\lambda_2$). The frequency difference between the original signal and the backscattered Brillouin light is called Brillouin frequency shift, and it is dependent on the temperature and the strain of the fiber where the backscattered Brillouin light originates.

The methods and system of the embodiments described herein are suitable for providing strain and temperature data based on characteristics of back-scattered Brillouin light from the optical fiber attached to the host structures or objects. The method(s) and/or system(s) of the embodiments described herein utilize the dependence of the Brillouin frequency shifts and/or the intensity of the changes in Brillouin signal on changes in strain and temperature. In these embodiments the sensing system for simultaneously determining strain and temperature characteristics includes a signal generator (e.g., a light source and the optical pulse generator) and a detection circuit (e.g., a backscatter detector or a spectrum analyzer, and a computer). Preferably the signal generator produces a high power light signal ($\lambda_1$) which is then launched into the optical fiber. As the light signal ($\lambda_1$) propagates along the optical fiber, the back-reflected (back-propagating) spontaneous Brillouin scattering (at a slightly different wavelength from that of the signal light) carries fiber strain and temperature information that can be detected, for example via a spectrum analyzer. By comparing the differences between the launched signal ($\lambda_1$) and the back-reflected scattering (at the wavelength ($\lambda_2$), the temperature and strain information can be extracted. To further measure temperature and strain independently, the Brillouin optical time domain reflectometry (BOTDR) technique is preferably utilized, in which both the Brillouin frequency shifts and the change in power (i.e., the change amplitude of the multiple Brillouin peaks) are used to obtain the change in temperature and strain simultaneously along the length of optical fiber. Note that to monitor the structure in real time, in order to make accurate measurements the optical fiber has to be firmly attached to the host materials or structures, for example, by staples or adhesive materials. During the attachment process the optical fiber may be bent with small bend radii (e.g., 2-15 mm) Such attachment techniques for fiber installation can lead to high macro-bend loss. With the high macro-bend loss, signal power fluctuation and noise characteristics can result. Accordingly, for some applications, it is preferable that the fiber is relatively bend insensitive while it provides multiple Brillouin peaks.

If the optical fiber has multiple Brillouin peaks (e.g., two peaks), the frequency shifts of the Brillouin frequencies are different between the first and second peaks as they are generated by different combination of the contributions from the temperature and strain. Therefore, the Brillouin frequency shifts of the two Brillouin peaks of such fiber can be used to obtain the changes in temperature and strain simultaneously, while avoiding the need of other measurements. The availability of the two Brillouin peaks within the sensing fiber makes it possible to separate the Brillouin frequency change due to strain as well as due to temperature changes, and therefore helps to accurately detect the cause of the change in structural monitoring. Preferably the amplitude $A_1$ of at the least one of said Brillouin peaks is within 50% to 150% of the amplitude $A_2$ of the other Brillouin peak of the fiber, such that $0.5A_2 \leq A_1 \leq 1.5A_2$. According to some embodiments $0.6A_2 \leq A_1 \leq 1.4A_2$. For example, $0.7A_2 \leq A_1 \leq 1.3A_2$, $0.75A_2 \leq A_1 \leq 1.25A_2$; $0.8A_2 \leq A_1 \leq 1.2A_2$; and $0.9A_2 \leq A_1 \leq 1.1A_2$. Having an optical fiber (sensing fiber) with two Brillouin peaks of approximately the same amplitude improves the sensitivity of the sensing system to changes in temperature and strain along the length of the fiber. It is noted that the simultaneous measurement of temperature and strain can help separate structure related effects from the detected changes due to temperature variations, and thus can provide more accurate analysis and prediction on structure related problems.

However, one side effect of having multiple-Brillouin-peaks in the fiber is the lower signal power of Brillouin back-scattering associated with each peak (as compared to the fiber that has only one Brillouin-peak) due to the reduced amplitude of each peak It is noted that if the amplitude of one of the Brillouin peaks is much smaller than that the other peak, it can become difficult to detect the frequency shifts of the smaller peak, which can result in reduction of system's sensitivity and in smaller S/N ratios. Accordingly, it is preferable that the amplitudes of the amplitudes $A_1$, $A_2$ of the two Brillouin peaks are within 50% to 100% of one another (i.e., that the two peaks have about the same amplitude). Furthermore, the system performance can be reduced if excessive loss is introduced during the installation of the fiber and its attachment to the structure (such as, for example, a bridge, building, or oil pipeline). One way to overcome this problem is to make the optical fiber bending insensitive so that longer lengths of fiber can be used, to cover a greater area. Accordingly, in at least some embodiments, the optical fiber used for sensing has multiple-Brillouin-peaks and is bending insensitive such that bend loss is less than 1 dB/turn at 5 mm bend radius (for example less than 0.5 dB/turn at 5 mm bend radius), and preferably less than 0.2 dB/turn at 5 mm bend radius, and more preferably less than 0.1 dB/turn at 5 mm bend radius. This can be achieved, for example, by having a sensing optical fiber that has a moat layer surrounding the fiber core, for example a down-doped layer, or a layer with a plurality of microstructures such as air filled capillaries, or voids.

In some embodiments, the fiber with multiple Brillouin peaks is a polarization maintaining (PM) or a single polarization (SP) fiber. In some embodiments, the PM or SP fiber with multiple-Brillouin-peaks is also bending insensitive such that bend loss is less than 1 dB/turn at 5 mm bend radius (e.g. less than 0.5 dB/turn, less than 0.2 dB/turn at 5 mm bend radius, and preferably less than 0.1 dB/turn at 5 mm bend radius). The use of bending insensitive fiber greatly improves the measurement range and coverage of distributed monitoring of temperature and strain.

Furthermore, if the optical fiber is a polarization maintaining fiber, or a single polarization fiber, the sensitivity of the sensing system can be further improved. For example, the PM property of the optical fiber preserves polarization states of the launched optical signal and results in stronger back-scatted Brillouin light, and thus helps to achieve an improvement in signal to noise ratio (e.g., 1.5 to 2 times improvement in S/N ratio). According to some embodiments the sensing optical fiber has birefringence of at least $2 \times 10^{-4}$, or greater than $3 \times 10^{-4}$ or even greater than $5 \times 10^{-4}$ (e.g., $6 \times 10^{-4}$, $7 \times 10^{-4}$, $8 \times 10^{-4}$, $9 \times 10^{-4}$, or even $10^{-3}$) at the operating wavelength. The operating wavelength may be, for example, 1550 nm, 1310 nm, 1060 nm, or 860 nm.

Various Embodiments Will be Further Clarified by the Following Examples

Reference will now be made in detail to the present preferred embodiment(s) of the invention, examples of which are illustrated in the accompanying drawings. Whenever possible, the same reference numerals will be used throughout the drawings to refer to the same or like parts. One embodiment of the sensor system for simultaneously determining strain and temperature characteristics of an object is shown in FIG. 1, and is designated generally throughout by the reference numeral 10.

Some embodiments of the sensor system 10 include a light source or an optical signal generator 20 (e.g., the light source 22 and the optical pulse generator 26), an optical fiber (sensing fiber) 30, and a detection circuit 40. In the embodiment of FIG. 1 the signal generator 20 produces an optical signal (light at wavelength $\lambda_1$) modulated at proper frequencies. The optical fiber 30 is firmly attached/secured to the structure 50 (not shown) so that any physical and temperature changes from the structure can be obtained by the fiber 30. In this embodiment the detection circuit 40 detects back-scattered Brillouin light and a computer 60 (which may be a part of the detection circuit 40) analyzes its characteristics for extracting temperature and strain over the entire sensing fiber 30.

Figure 1:
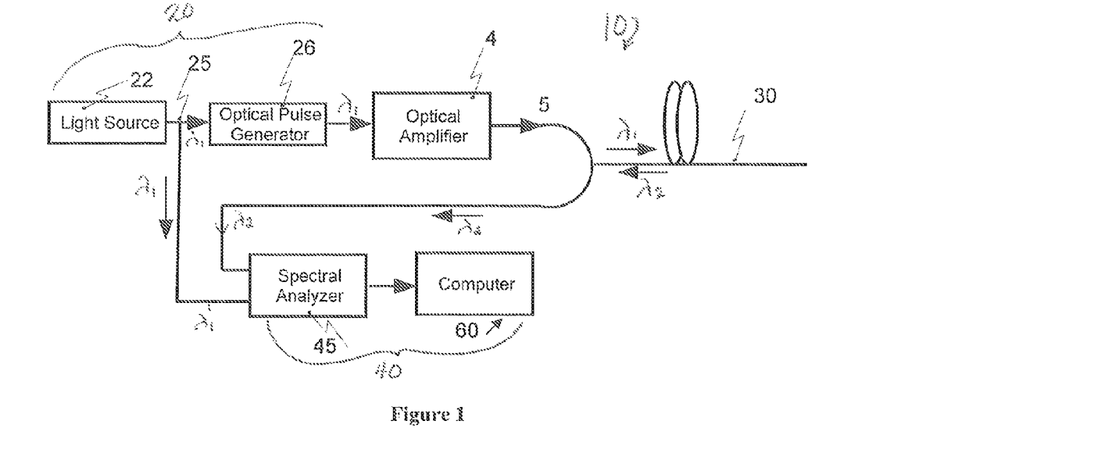
FIG. 1 is a schematic view of one embodiment of the of distributed temperature and strain measurement system.

More specifically, in the embodiment of FIG. 1, the light source 22 is a distributed feedback (DFB) laser diode (LD) operating at a single longitudinal mode with a spectral linewidth less than several MHz. The continuous-wave optical signal (light at wavelength $\lambda_1$) emitted from the DFB LD has a frequency of $f_0$. The light is split into two ports via a fiber coupler 25. The split ratio is properly chosen so that sufficient power is obtained for signal detection. In this embodiment the split ratio is 90% and 10%, however, other ratios may also be utilized by using a different coupler (e.g., 95%/5% or 98%/2%). The majority of light (in this embodiment 90%) is propagated toward an optical pulse generator 26 which chops the continuous light (that has wavelength $\lambda_1$) into a series of pulses. The smaller portion (10%) of the light is directed to the detection circuit 40 (e.g., to a spectral analyzer 45). The pulse duration is determined by the length of the optical fiber 30. For example, the pulse period should be less than 200 μs for a measurement distance range of 10 km (i.e., the length of sensing fiber 30 is about 10 km), and about 2 μs for a measurement distance range of about 100 m. The spatial resolution $\delta z$ is determined by $\delta z = c\delta t/2n$, where c is the light velocity in free space, n is the fiber core's refractive index, and $\delta t$ is the pulse duration. It is noted that in order to provide high resolution of location (i.e. distance) corresponding to the measured strain it is preferable for the pulse rise time to be about a nanosecond (e.g., 0.5 nsec to 5 nsec).

In this embodiment an optical amplifier 28 amplifies the pulsed signal ($\lambda_1$) to an adequate level so that amount of simultaneous Brillouin scattering (light at wavelength $\lambda_2$) from the sensing fiber 30 is sufficient for detection. For example, the optical amplifier 28 may include an Er-doped fiber to provide a total gain of higher than 20 dB, in order to increase the signal peak power by more than 100 times, without modifying the signal pulse. The amplified pulsed optical signal ($\lambda_1$) is then launched into the sensing fiber 30.

In an optical fiber such as the sensing fiber 30, the optical pulses undergo Raleigh, Brillouin, and Raman backscattering. However, only the Brillouin scattering with a frequency shift of $\Delta f$ is analyzed using the detection circuit 40 based on frequency beating between the original optical signal ($\lambda_1$) and the backscattered ($\lambda_2$) light. The measured frequency shift is then used by a computer 60 to compute temperature and strain information.

For an optical fiber 30 that has at least two Brillouin gain peaks, the frequency shifts at the two peaks relating to strain E and temperature T are given as:

$$\Delta v_B^{PK1} = C_\epsilon^{PK1} \Delta\epsilon + C_T^{PK1} \Delta T \quad (1)$$

$$\Delta v_B^{PK2} = C_\epsilon^{PK2} \Delta\epsilon + C_T^{PK2} \Delta T \quad (2)$$

where $C_\epsilon^{PK1}$ is the strain coefficients for the first peak (peak 1); $C_\epsilon^{PK1}$ is the strain coefficients for the second peak (i.e., the peak 2), $C_T^{PK1}$ is the temperature coefficient for the first peak and $C_T^{PK2}$ is the temperature coefficient for the second peak.

The strain coefficients for the first peak ($C_\epsilon^{PK1}$ and $C_\epsilon^{PK2}$) have the same value; and the temperature coefficients for the two peaks $C_T^{PK1}$ (first peak) $C_T^{PK2}$ and for the second peak have different values. As a result, the change in temperature can be given by $$\Delta T = \frac{\Delta v_B^{PK1} - \Delta v_B^{PK2}}{C_T^{PK1} - C_T^{PK2}}. \quad (3)$$

When $\Delta T$ is known, the change in fiber strain can also be obtained using the following equation:

$$\Delta\epsilon = \frac{\Delta v_B^{PK1} - C_T^{PK1} \Delta T}{C_\epsilon^{PK1}} \quad (4)$$

Therefore, the use of a two-peak Brillouin spectrum can provide simultaneously distributed temperature and strain measurement along length of the fiber link through the frequency analysis of the measured spontaneous Brillouin spectra. Thus, the sensor 10 is suitable for measuring, simultaneously, both strain and temperature changes along the length of optical fiber 30.

As discussed above, optical fiber 30 has multiple Brillouin peaks. Brillouin spectrum is influenced by the geometric structures of optical fibers as well as the fiber (material) compositions. The optical and acoustic refractive index profile of the optical fiber 30 determines optical and acoustic performance of the optical fiber and thus the amplitudes and positions of Brillouin peaks. As stated above, the shifts in Brillouin peaks (for example, due to strain) can be detected more easily if the two peaks have approximately the same amplitudes (i.e., if both of the peaks are large). If one of the Brillouin peaks is much smaller than the other, it can be more difficult to accurately detect the shifts of the smaller peak, which can result in reduction of the system's sensitivity.

We have determined that there are several types of optical fiber 30 that are suitable for enhanced distributed Brillouin sensing. For example, according to some embodiments, optical fibers 30 with multiple Brillouin peaks may have high core delta (>2%) relative to silica, and small core sizes (e.g., core diameters of about 4 to 8 μm). However, optical fiber 30 with larger diameters and smaller refractive index core deltas may also be utilized.

OPTICAL FIBER EXAMPLES #1 And #2

Figure 2:
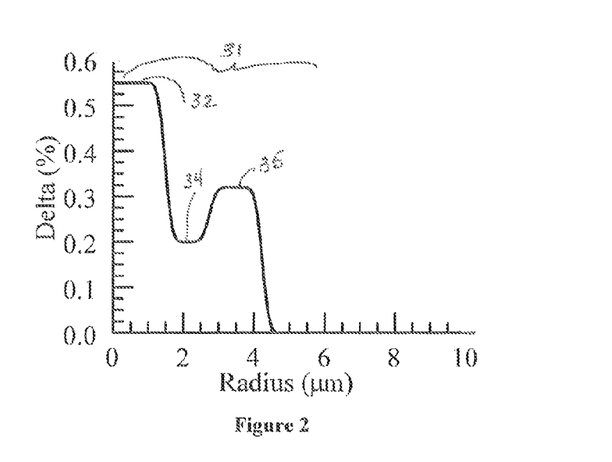
FIG. 2 is a refractive index delta profile of one exemplary optical fiber (also referred to as a sensing fiber herein) utilized in the temperature and strain measurement system of FIG. 1.
Figure 3:
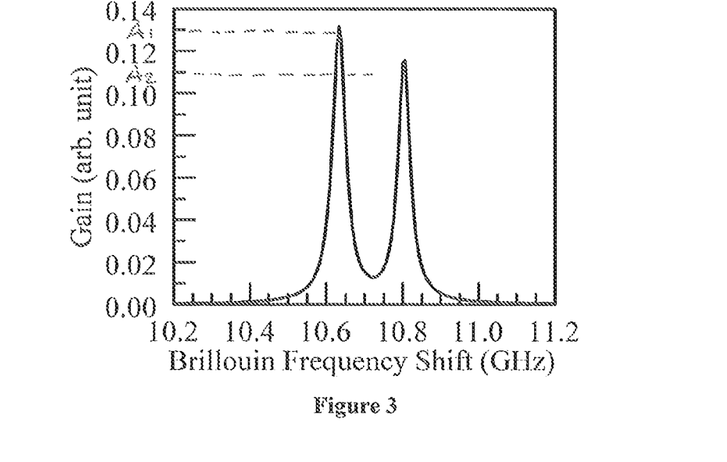
FIG. 3 is a Brillouin gain spectrum of the one exemplary optical fiber of FIG. 2.

The refractive index delta profile of one embodiment of the optical sensing fiber 30 (fiber #1) is shown in FIG. 2. This fiber includes a core 31 with a central region 32, an annular region 34 with a relatively low refractive index delta adjacent to and surrounding the region 32, and an annular region 35 adjacent to and surrounding the region 34 with a refractive index delta adjacent higher than that of region 34. The fiber core 31 is surrounded by the cladding 39. The parameters of this fiber are listed in Table 1. This optical fiber 30 (fiber #1) has a MFD of 10.15 μm at 1550 nm, an effective area $A_{eff}$ of 77 μm² at 1550 nm, and a dispersion of 14.3 ps/nm/km, as shown in Table 2. The theoretical cutoff wavelength of optical fiber 30 of this embodiment is 1227 nm. The calculated Brillouin spectrum of the fiber is shown in FIG. 3. FIG. 3 illustrates that the two Brillouin peaks are well separated and that in this embodiment their amplitudes are comparable (i.e., within 50% of one another). More specifically, in this embodiment the first peak's amplitude $A_1$ is about 1.2× that of the smaller (second) peak's amplitude (i.e., in this embodiment $A_1 \approx 1.2 A_2$). As discussed above, the distributed sensing can be conducted by monitoring the shifting of the two peaks along the length of the fiber 30. As described by Eqs. (1-2) the amount of frequency shifts contributed by the change of stain and temperature follows different linear combination so that by solving Eqs. (1-2) the contribution from strain and temperature can both be obtained.

Figure 4:
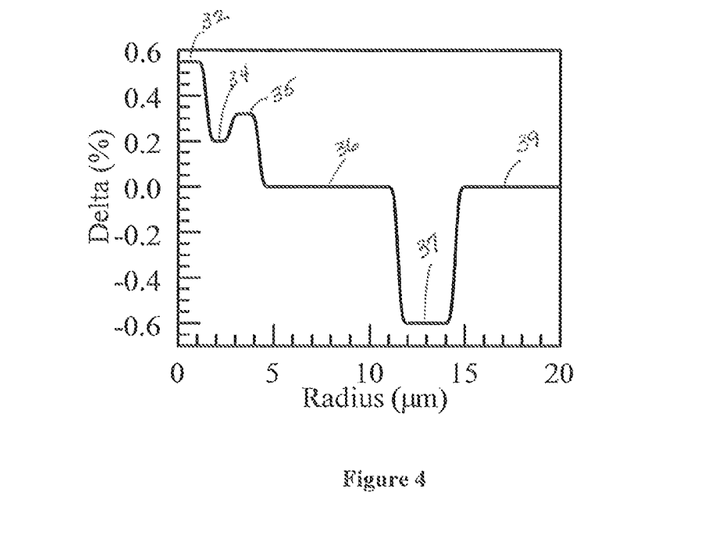
FIG. 4 is a refractive index delta profile of another exemplary optical fiber utilized in the temperature and strain measurement system of FIG. 1.
Figure 5:
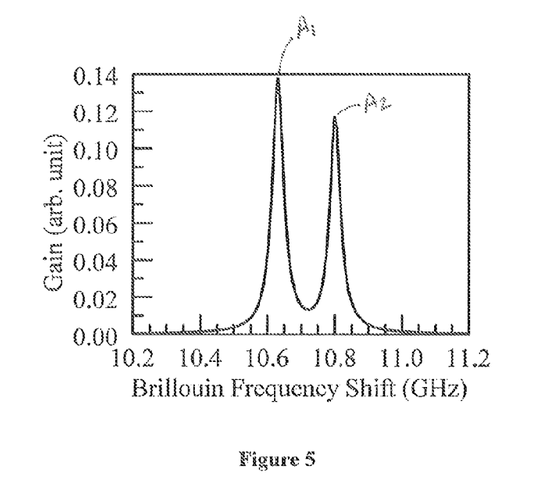
FIG. 5 is a Brillouin gain spectrum of the one exemplary optical fiber of FIG. 4.

In another embodiment (fiber #2), we added bending improvement structure to the optical fiber 30. In the optical fiber 30 (fiber #2) of this embodiment, this was done by surrounding the fiber core 31 with a moat layer 37 that has a negative refractive index delta (relative to silica). The moat region or layer 37 may be formed, for example, by either fluorine doping or by a fiber region with a plurality of gas-filled voids. More specifically, fiber #2 includes a core 31 with a central region 32, an annular region 34 with a relatively low refractive index delta adjacent to and surrounding the region 32, and the annular region 35 adjacent to and surrounding the region 34 with a refractive index delta higher than that of region 34. The core region 35 of this exemplary fiber is surrounded by a pure silica layer 36. The moat region or layer 37 is adjacent to and surrounds the layer 36. The refractive index delta of the exemplary fiber #2 with this structure is shown in FIG. 4. The Brillouin spectrum of fiber #2 is shown in FIG. 5. In this embodiment $A_1 \approx 1.15 A_2$ and the two peaks are situated in the same locations as those of fiber #1. Because the moat region of this fiber is placed significantly away from the core 31 (it is separated from the core by the layer 36), it has little effect on the fiber's Brillouin scattering properties. Thus, the Brillouin spectrum shown in FIG. 5 is very similar to that shown in FIG. 3. Other optical properties of fiber #2 are also similar to those of fiber #1. Exemplary fiber #2 has a MFD of 10.0 μm at 1550 nm, an effective area $A_{eff}$ of 75.2 μm² at 1550 nm, and a dispersion of 15.9 ps/nm/km, as shown in Table 2

TABLE 1

|  | Fiber #1 | Fiber #2 |
|---|---|---|
| Centerline Delta (%) $\Delta_{31}$ | 0.55 | 0.55 |
| Centerline Rad (um) | 2 | 2 |
| $\Delta_{34}$ (%) | 0.2 | 0.2 |
| $\Delta_{35}$ (%) Ring Delta | 0.32 | 0.32 |
| Ring Center Rad. $r_{35}$ (um) | 3.5 | 3.5 |
| Rign Width $W_{35}$ (um) | 1.5 | 1.5 |
| Alpha | 10 | 10 |
| Moat Start Rad. (um) | NA | 11.5 |
| Moat End Rad. (um) | NA | 14.5 |
| Moat Delta (%) | NA | −0.6 |

The optical properties (including bending properties) of fibers #1 and #2 of Table 1 are provided in Table 2. We have listed both the absolute bending loss at 10 mm and 15 mm bend radius at 1550 nm. We also show the normalized results (bending losses relative to that of SMF-28$^R$ fiber that has 0.34% core delta and core radius of 4.2 microns). Exemplary fiber #1 has slightly worse bending performance than the SMF-28$^R$ fiber, while fiber #2 has bending performance superior to that of fiber #1 and to SMF-28$^R$ fiber.

TABLE 2

|  | Fiber #1 | Fiber #2 |
|---|---|---|
| MFD @1550 nm (um) | 10.15 | 10 |
| Effective Area @1550 nm (um) | 77 | 75.2 |
| Dispersion @ 1550 nm (ps/nm/km) | 14.3 | 15.9 |
| Theoretical Cutoff λ (nm) | 1227 | 1177 |
| Bending Loss at 10 mm Radius (dB/m) | 16.6 | 0.35 |
| Bending Loss at 15 mm Radius (dB/m) | 0.29 | 0.01 |
| Normalized Bending Loss at 10 mm Radius | 1.38 | 0.029 |
| Normalized Bending Loss at 15 mm Radius | 1.68 | 0.06 |

OPTICAL FIBER EXAMPLES #3A And #3B

Figure 6A:
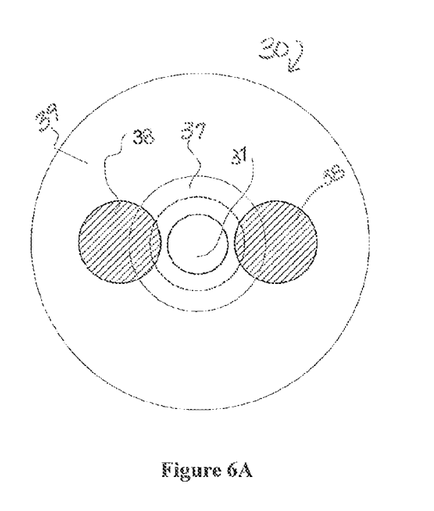
FIGS. 6A and 6B show schematic cross-sectional view of further exemplary fibers with multiple Brillouin gain peaks that can be utilized in the temperature and strain measurement system of FIG. 1
Figure 6B:
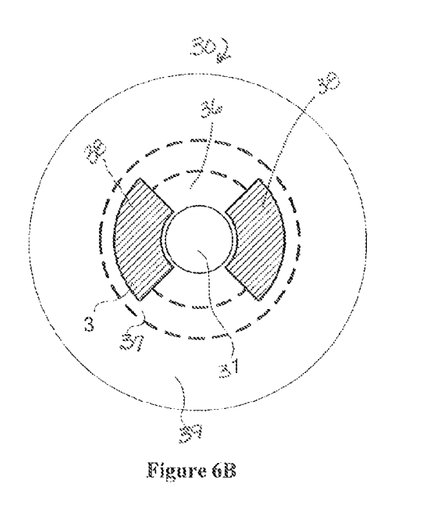

If the optical fiber 30 is a polarization maintaining fiber, the fiber can preserve the polarization states of the launched signal and that of the backscattered light, so that the Brillouin scattering can be measured with high signal to noise ratios. It is known that the polarization of the light affects Brillouin scattering. For a PM fiber, if the polarization of the signal light and the back-scattered light are aligned with one of the principal polarization axes of the optical fiber, the polarization axis of linearly polarized signal and of the back-scattered light stay in the same direction along the optical fiber 30. In this case more back-scattered Brillouin light can be observed. Compared with an approach in which a non-PM fiber is used and the polarization state of light changes randomly due to random perturbation including mode coupling, the use of PM optical fiber 30 can improve back-scattered Brillouin light by a factor of 1.5 to 2, as compared to that when a non-PM fiber is utilized. Other benefits of using PM fiber for strain and temperature monitoring include elimination of polarization managing components in the sensor system, which results in a small package, as well as more robust performance because the amounts of signal light and Brillouin backscattered light are sufficient for measurements. Therefore, polarization maintenance inducing members (e.g., stress rods) can be optionally added to the optical fibers 30. FIGS. 6A and 6B show schematically the cross-section of the PM optical fiber 30 (fiber #3A and fiber #3B). The cores 31 of fibers #3A and 3B provide single-mode cutoff wavelength below 1300 nm, and the fibers have at least two Brillouin peaks. Surrounding the core 31 is a thin layer of low refractive index moat 37 induced by down-doping pure silica glass or nanostructures (such as capillaries, gas filled voids, or random airlines). The stress members 38 provide the PM property to the sensing optical fiber #3A and #3B.

FIBER EXAMPLE #4

The optical fiber 30 of fiber example #4 comprises a core 31 that is co-doped with both Ge ($GeO_2$) and F. In this example, the optical fiber 30 has substantially the same overall refractive index profile as shown FIG. 7A. The core 31 of this exemplary sensing fiber has the outer radius of 4.2 μm and is doped with Ge. The core 31 is also doped with fluorine in two areas: one area with radius of 0-1.6 microns (i.e., the area extending from the center line to 1.6 μm), and the annular area with an inner radius of 2.8 μm and an outer radius of 4.2 microns. The fluorine's only refractive index delta contributions for these two core areas are −0.25% and −0.15%, respectively (see FIG. 7C). As a result, the fiber has the acoustic delta profile shown in FIG. 7B. Fluorine changes the acoustic delta profile so that the overlap of the L01 and L02 acoustic modes has similar overlapping with the LP01 optical mode. This results in dual Brillouin frequency peaks with comparable magnitude ($A_1 \approx 0.75 A_2$) as shown in Brillouin spectrum illustrated in FIG. 8.

Figure 7A:
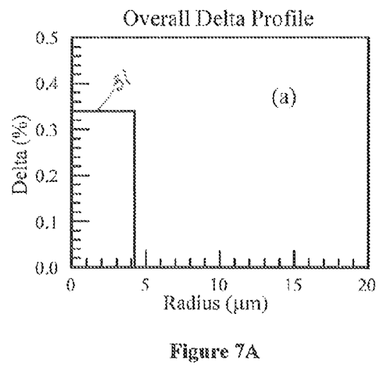
FIG. 7A illustrates a refractive index delta profile of one or more exemplary optical fibers utilized in the temperature and strain measurement system of FIG. 1.
Figure 7B:
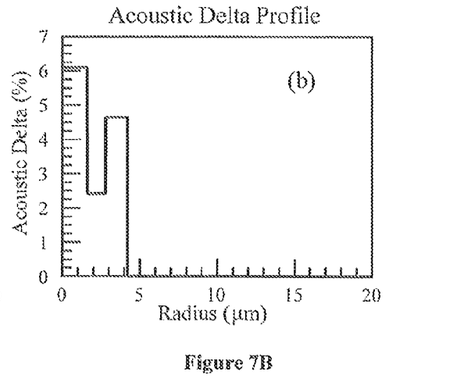
FIG. 7B illustrates an acoustic delta profile of one exemplary optical fibers corresponding to FIG. 7A.
Figure 7C:
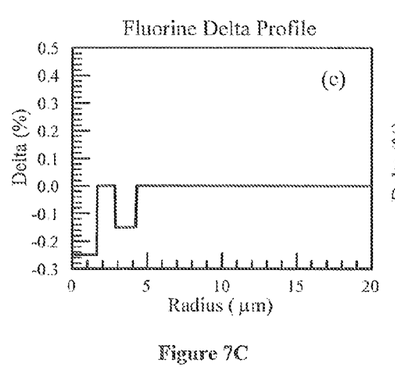
FIG. 7C is a refractive index delta profile produced by F only, of the optical fiber corresponding to FIG. 7B.
Figure 7D:
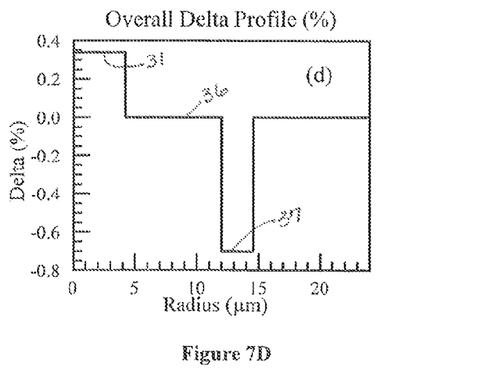
FIG. 7D illustrates a refractive index delta profile of one or more exemplary optical fibers utilized in the temperature and strain measurement system of FIG. 1.
Figure 8:
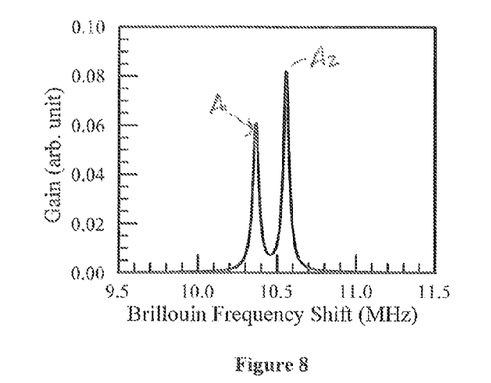
FIG. 8 is Brillouin spectrum of one exemplary optical fibs that has a refractive index delta profiles shown FIGS. 7A and 7D.

This fiber design can be further improved by adding bending insensitive feature such as the moat 37, spaced from the core 31 by a region 36, as shown in FIG. 7D. This can be achieved, for example, by a layer of Fluorine doped silica or by adding a nano-structured region. The moat 37 does not have noticeable effects on the Brillouin spectrum, and therefore all the desired properties of the refractive index delta profile shown in FIG. 7A are maintained in the bending insensitive fiber 30 that has a refractive index delta profile shown in FIG. 7D. The moat 37 does not significantly change the locations or amplitudes ($A_1$, $A_2$) of the Brillouin peaks of the Brillouin spectrum shown in FIG. 8.

It is noted that the optical fiber 30 may also utilize a gradient index profile to avoid a sharp change of refractive index, which creates an interface and can introduce additional attenuation of light. For example, according to some embodiments the refractive index profile of the core has a parabolic (or substantially parabolic) shape and an␣a value of between 1.8 and 8 (e.g., 2), as measured at 850 nm. The optical fiber 30 with gradient index also have multiple Brillouin peaks similar to those shown in FIGS. 3, 5, 8 and 10.

FIBER EXAMPLE #5

Figure 9A:
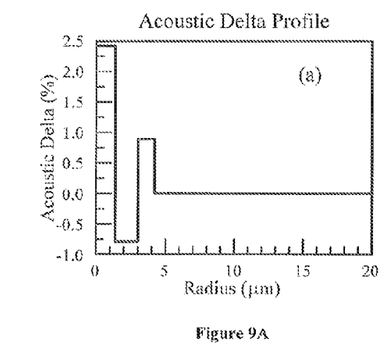
FIG. 9A is the acoustic delta profile delta profile of one exemplary optical fiber utilized in the temperature and strain measurement system of FIG. 1.
Figure 9B:
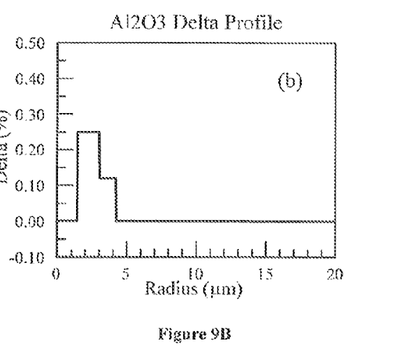
FIG. 9B is refractive index delta profile produced by $Al_2O_3$ dopant only, of the optical fiber that has the acoustic delta profile of FIG. 9A.
Figure 10:
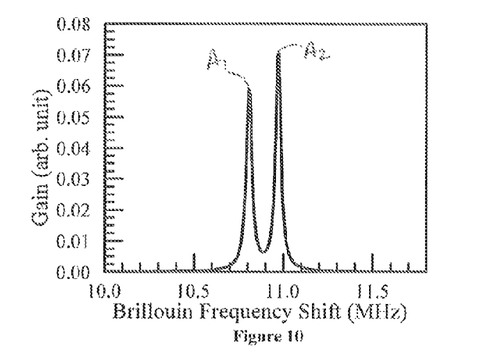
FIG. 10 is the Brillouin gain spectrum of the one exemplary optical fiber of FIGS. 9A and 9B.

The optical fiber 30 of fiber example #5 comprises a core 31 that is co-doped with both Ge ($GeO_2$) and $Al_2O_3$. In this example, the optical fiber 30 has substantially the same overall index profile as shown FIG. 7A. The core 31 of this exemplary fiber has an outer radius of 4.2 nm and is doped with Ge. The core is also doped with $Al_2O_3$ in two areas: the first annular area with $Al_2O_3$ delta contribution of about 0.25% that has an inner radius of 1.4 μm and extends to the outer radius of 3.0 μm, and the second annular area with the inner radius of 4 μm and the outer radius of 4.2 μms, with alumina's refractive index delta contribution of 0.12% (see FIG. 9B). This results in the acoustic delta profile shown in FIG. 9A. The use of the $Al_2O_3$ changes the acoustic delta profile so that the overlap of the L01 and L02 acoustic modes has similar overlapping with the LP01 optical mode. This also results in dual Brillouin frequency peaks with comparable magnitude as shown in Brillouin spectrum illustrated in FIG. 10.

This fiber design can be further improved by adding a bending insensitive feature such as the moat 37, spaced from the core 31 by a pure silica region 36, as shown in FIG. 7D. This can be achieved, for example, by a layer of Fluorine doped silica or by a nano-structured region (e.g., a layer containing gas filled capillaries or random voids). The moat does not have noticeable effects on the Brillouin spectrum and therefore has all the desired properties in the refractive index delta profile shown in FIG. 7A are maintained in the bending insensitive fiber. This moat does not significantly change the locations or amplitudes ($A_1$, $A_2$) of the Brillouin peaks shown in FIG. 10. It is noted that example #5 fiber can be easily modified to have a gradient index profile, in order to avoid a sharp change of refractive index, which creates an interface and can introduce additional attenuation of light. The optical fibers 30 with gradient index profile and Ge and $Al_2O_3$ codoped core as discussed above have multiple Brillouin frequency peaks similar to those shown in FIGS. 3, 5, 8 and 10. Furthermore the optical fibers 30 with gradient index profile and Ge and $Al_2O_3$ codoped core may also be PM or SP fibers and may include, for example, two stress rods 38 described above, enabling PM or SP performance.

OTHER EXEMPLARY FIBERS

For optimal strain and temperature detection using BOTDR, it is preferable that the fiber produces reasonably strong Brillouin light, so that back-scattered Brillouin signals can be easily detected. In order to achieve this, and to further improve system sensitivity, it may be preferable to utilize optical fibers 30 that have reduced effective area $A_{\mathit{eff}}$, preferably in the range of 40 $\mu m^2 \leq A_{\mathit{eff}} \leq 70$ $\mu m^2$ at the operating wavelength (in this example 1550 nm). For example, $A_{\mathit{eff}}$ may be 40 $\mu m^2$-68 $\mu m^2$, or 40 $\mu m^2$-65 $\mu m^2$, or 40 $\mu m^2$-60 $\mu m^2$. Optionally, one can adjust the relative strength of the second Brillouin peaks compared to the first one so that the SBS threshold can be further lowered. Such exemplary fibers are described below.

EXAMPLE 6

The optical fiber 30 of fiber example #6 comprises a core 31 that is co-doped with both Ge and F. This fiber has a refractive index delta profile shown in FIG. 11A. The fiber has substantially lower effective area at 1550 nm than the fibers of the previous examples. The effective area of this fiber at 1550 nm is 48.3 $\mu m^2$, which results in 2.4 dB lower SBS threshold than an SMF-28$^R$ fiber with step index. At 1550 nm the optical fiber 30 of this embodiment has a dispersion of 14.7 ps/nm/km and the theoretical cutoff of this fiber is lower than 1390 nm. The core 31 of this exemplary fiber has the outer radius of 3.4 μm and the entire core is doped with Ge. The core 31 is also doped with fluorine in two areas: one area with radius of 0-1.6 microns (i.e., the area extending from the center line to 1.6 μm) and the annular area with the inner radius of 2.3 μm and an outer radius of 3.4 microns, with Fluorine's refractive index delta contribution −0.2% and −0.08%, respectively (see FIG. 11C). As a result, we have the acoustic delta profile shown in FIG. 11B. Fluorine changes the acoustic delta profile so that the overlap of the L01 and L02 acoustic modes has similar overlapping with the LP01 optical mode. This results in dual Brillouin frequency peaks with comparable magnitude ($A_1 \approx 0.7 A_2$) as shown FIG. 12.

Figure 11A:
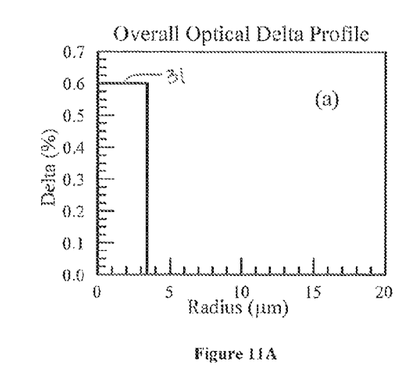
FIG. 11A is the optical delta profile of another exemplary optical fiber utilized in the temperature and strain measurement system of FIG. 1.
Figure 11B:
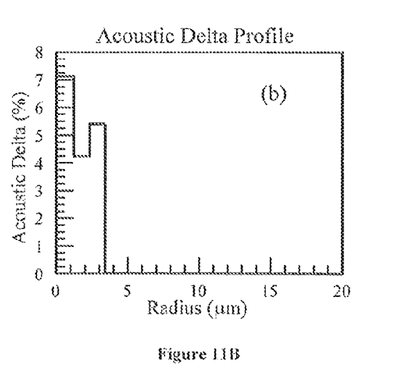
FIG. 11B illustrates an acoustic delta profile of one exemplary optical fiber corresponding to FIG. 11A.
Figure 11C:
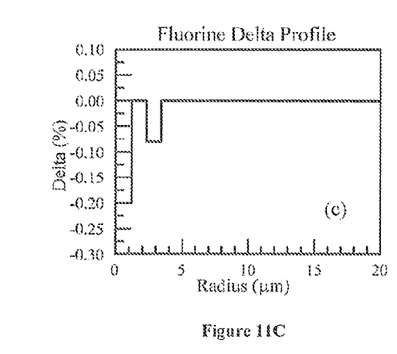
FIG. 11C is a refractive index delta profile produced by F only, of the optical fiber corresponding to FIG. 11B.
Figure 11D:
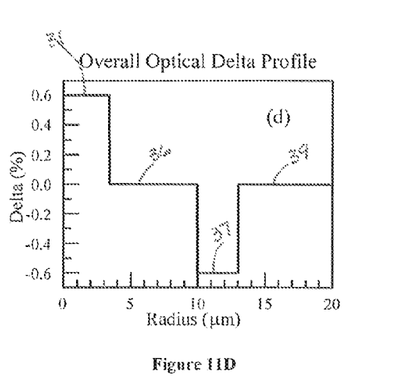
FIG. 11D illustrates the refractive index delta profile of another exemplary optical fiber utilized in the temperature and strain measurement system of FIG. 1.
Figure 12:
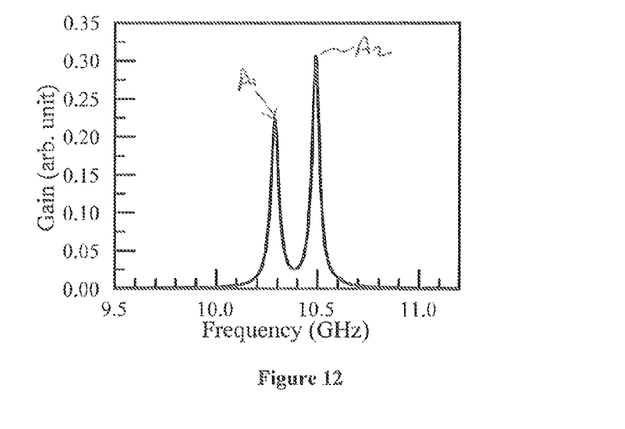
FIG. 12 is a Brillouin gain spectrum of the one exemplary optical fibers that has a refractive index delta profiles shown FIGS. 11A and 11D.
Figure 13:
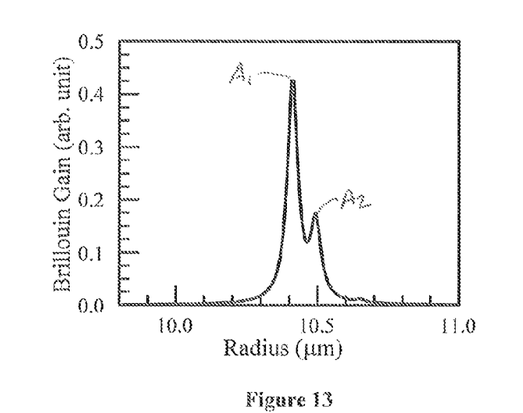
FIG. 13 illustrates the Brillouin frequency spectrum of an another exemplary fiber with that is co-doped with Ge and F.

This fiber design can be further improved by adding a bending insensitive feature such as the moat 37, spaced from the core 31 by a region 35, as shown in FIG. 11(d). This can be achieved, for example, by a layer of Fluorine doped silica or by a layer containing nanostructures, as described above. The moat does not have noticeable effects on the Brillouin spectrum and therefore all the desired properties in the refractive index delta profile shown in FIG. 11(a) are maintained in the bending insensitive fiber. This moat does not significantly change the locations or amplitudes ($A_1$, $A_2$) of the Brillouin peaks shown in FIG. 12. We also note that in the practical implementation of the fiber profile, a core with the gradient index can be used to avoid a sharp change of refractive index, which creates an interface and can introduce additional attenuation of light. Furthermore the optical fibers 30 with a gradient index profile and Ge and F codoped core and small effective areas (e.g., 40-70 $\mu m^2$, 40-65 $\mu m^2$, or 45-60 $\mu m^2$) may also be PM or SP fiber and may include, for example, two stress rods 38 described above, enabling PM or SP performance The relative strengths of the Brillouin peaks (the ratios of peak amplitudes $A_1$, $A_2$) can also be adjusted to further reduce the fiber SBS threshold to enhance the SBS effects. For example, modifying fiber example #6 by adjusting the Fluorine doping level so as to provide refractive index delta of −0.12% in the area extending between radii 0 and 1.2 μm, while keeping all other parameters unchanged, we changed the amplitudes of the two Brillouin peaks (see FIG. 13). FIG. 13 indicates that the amplitude $A_2$ of the second Brillouin peak is now much lower than the one shown in FIG. 12. It is noted that because this fiber has a small effective area $A_{eff}$, it exhibits strong back-scattered Brillouin light, which results in better detection and thus sensor system 10 has greater strain detection sensitivity.

EXAMPLE 7

Fiber with $GeO_2$—$Al_2O_3$ Co-Doping in the Core

Figure 14A:
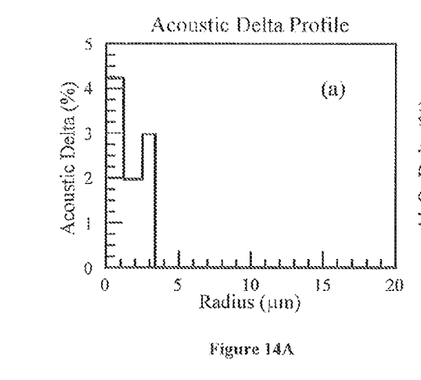
FIG. 14A illustrates the acoustic delta profile of an optical fiber that has a core co-doped with Ge and Al co-doping in the core.
Figure 14B:
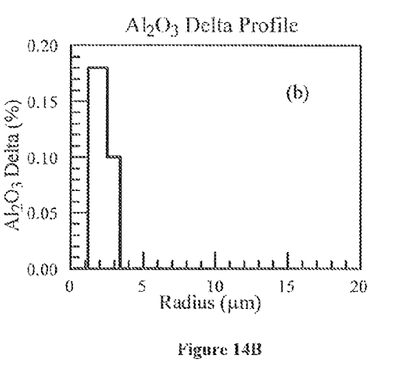
FIG. 14B illustrates the refractive index delta contribution from the $Al_2O_3$ doping for the optical fiber that has a core co-doped with Ge and Al co-doping in the core.
Figure 15:
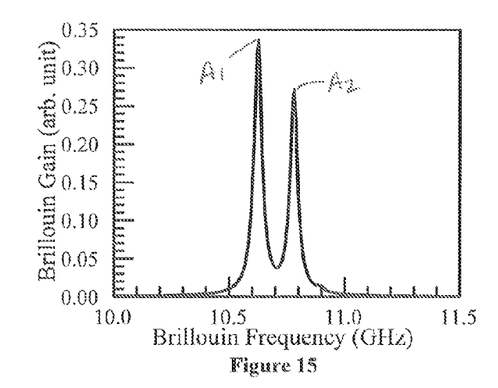
FIG. 15 illustrates Brillouin frequency spectrum of the exemplary fiber that corresponds to FIGS. 14A and 14B.

The optical fiber 30 of fiber example #7 comprises a core 31 that is codoped with both Ge (i.e., $GeO_2$) and $Al_2O_3$. It is noted that this optical fiber 30 has a small effective area $A_{eff}$ (Aeff<70, and in this case<60 μm²) which helps the fiber to have strong back-scattered Brillouin light, and which in turn results in better detection and greater strain detection sensitivity for the sensor system 10. More specifically, the optical fiber 30 has substantially lower effective area at 1550 nm than the fibers of examples 1-5. The effective area of this fiber at 1550 nm is 48.3 μm², which results in 2.4 dB lower SBS threshold than that of the SMF-28$^R$ fiber. At 1550 nm the optical fiber 30 of this embodiment has a dispersion of 14.7 ps/nm/km and the theoretical cutoff of this fiber is lower than 1390 nm. In this example, the optical fiber 30 has substantially the same overall refractive index profile as shown FIG. 11A. The core 31 of this exemplary fiber has the outer radius of 3.4 μm and is doped with Ge. The core 31 is also doped with $Al_2O_3$ in two adjacent regions: a first annular area with $Al_2O_3$ delta contribution of about 0.18% that has an inner radius of 1.2 μm and extends to an outer radius of 2.5 μm, and a second annular area with an inner radius of 2.5 μm and an outer radius of 3.4 μm, with alumina's refractive index delta contribution of 0.1% (see FIG. 14B). As a result, this fiber has the acoustic delta profile shown in FIG. 14A. The use of the $Al_2O_3$ changes the acoustic delta profile so that the overlap of the L01 and L02 acoustic modes has similar overlapping with the LP01 optical mode. This also results in dual Brillouin frequency peaks with comparable magnitudes, as shown in FIG. 15. In this exemplary fiber $A_1 \approx 1.2 A_2$ This fiber design can be further improved by adding a bending insensitive feature for example, a moat 37, spaced from the core 31 by a region 35. This can be achieved, for example, by a layer of Fluorine doped silica or by a layer containing nanostructures (e.g., gas field capillaries, or random bubbles, or airlines). The moat does not have noticeable effects on the Brillouin spectrum and therefore all the desired properties in the refractive index delta profile are maintained in the bending insensitive fiber. That is, the moat does not significantly change the locations or amplitudes ($A_1$, $A_2$) of the Brillouin peaks shown in FIG. 15. It is noted that this exemplary fiber can be easily modified to have a gradient index profile, in order to avoid a sharp change of refractive index, which creates an interface and can introduce additional attenuation of light. Furthermore, the optical fiber 30 with gradient index profile may also be PM or SP fiber and may include, for example, two stress rods 38 described above, enabling PM or SP performance.

In accordance with some exemplary embodiments of the present invention, a method of simultaneously determining strain and temperature characteristics of an object comprising the steps of: (i) providing at least one optical fiber 30 having at least two Brillouin peaks (preferably the amplitude $A_1$ of at least one of said Brillouin peaks is within 50% to 150% of the amplitude $A_2$ of another Brillouin peak $0.5 A_2 \le A_1 \le 1.5 A_2$); (ii) determining coefficients of strain and temperature for the optical fiber 30 along the length of the fiber; (iii) securing the optical fiber 30 to this object along a length thereof; (iv) inputting laser light into the optical fiber 30 at one end thereof; (v) measuring at least two Brillouin peak frequencies for the optical fiber 30; and (vi) calculating strain and temperature characteristics based on the coefficients of strain and temperature and the measured Brillouin frequencies for the optical fiber 30 along the length of the fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

One of the benefits, conferred by at least some of the exemplary embodiments is a method and a system described herein are capable simultaneous measurement of strain and temperature with high accuracy, by utilizing at least one optical sensing fiber with a plurality of Brillouin peaks. Another benefit conferred at least by some of the exemplary embodiments is a method and a system for the simultaneous measurement of strain and temperature can utilize a single fiber with a plurality of Brillouin peaks, eliminating the need for use of multiple fibers and a coupling means therebetween.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of simultaneously determining strain and temperature characteristics of an
object comprising the steps of:
  providing at least one optical fiber having at least two Brillouin peaks, such that the amplitude $A_1$ of at least one of said Brillouin peaks is within 50% to 150% of the amplitude $A_2$ of another Brillouin peak $0.5 A_2 \le A_1 \le 1.5 A_2$;
  (ii) determining coefficients of strain and temperature for said at least one optical fiber along the length of the fiber;
  (iii) securing said at least one optical fiber to said object along a length thereof with at least one connector;
  (iv) inputting laser light into said at least one optical fiber at the other ends thereof from a laser;
  (v) detecting back scattered light by a detection circuit and measuring the at least two Brillouin peak frequencies for said at least one optical fiber; and
  (vi) calculating strain and temperature characteristics of said object via an electronic device based on the coefficients of strain and temperature and the measured Brillouin frequencies for said at least one optical fiber along the length of the optical fiber.

2. The method of claim 1 wherein said method comprises providing a single optical fiber having at least two Brillouin peaks, and wherein said measuring step includes measuring at least frequency shifts of said least two Brillouin peak frequencies for said at least one optical fiber.

3. The method of claim 1 wherein said at least one optical fiber is bending insensitive such that bend loss is less than 1 dB/turn at 5 mm bend radius.

4. The method of claim 3 wherein said at least one optical fiber is bending insensitive such that bend loss is less than 0.1 dB/turn at 5 mm bend radius.

5. The method of claim 1 wherein said at least one optical fiber is a single-mode optical fiber.

6. The method of claim 5 wherein said at least one optical fiber has a cladding of pure silica and a core of pure silica doped with Ge (Germanium) or a cladding of pure silica doped with F (Fluorine) and a core of pure silica undoped with Ge (Germanium).

7. The method of claim 5 wherein said at least one optical fiber has a silica based core doped with at least two of: Ge (Germanium), Al (Aluminum), B (Boron).

8. The method of claim 5 wherein said at least one optical fiber is a single polarization (SP) fiber or a polarization maintaining (PM) fiber.

9. The method of claim 5 wherein said fiber has birefringence of at least greater than $10^{-4}$ at the operating wavelength.

10. The method of claim 9 wherein said fiber has birefringence of at least greater than $3 \times 10^{-4}$ at the operating wavelength.

11. The method of claim 1 wherein said at least one optical fiber has an effective area Aeff of less than 70 $\mu m^2$ at the operating wavelength.

12. The method of claim 11 wherein said at least one optical fiber has an effective area Aeff of 40 $\mu m^2$ to 70 $\mu m^2$ at the operating wavelength.

13. The method of claim 2 including directing laser light from a single laser having single-longitudinal mode said lasers into one end of said single optical fiber with at least two Brillouin peaks.

14. A system for simultaneously determining strain and temperature characteristics of an object comprising:
   (i) at least one optical fiber having at least two Brillouin peaks;
   (ii) at least one connector securing said at least one optical fiber to the object to be monitored;
   (iii) a laser positioned to provide laser light to said at least one optical fiber;
   (iv) a device measuring frequencies of said at least two Brillouin peaks, and determining frequency shifts of said at least two Brillouin peaks for said at least one optical fiber along the length of fiber; and
   (v) a system calculating strain and temperature characteristics along said fiber, based on the coefficients of strain and temperature as well as the measured Brillouin frequency shifts for said optical fiber along the length of said optical fiber.

15. The system of claim 14 wherein at least one of said Brillouin peaks is within 50% to 150% of the amplitude $A_2$ of another Brillouin peak such that $0.5A_2 \leq A_1 \leq 1.5A_2$.

16. The system of claim 14 wherein each of the fibers is a single-mode optical fiber.

17. The system of claim 14 wherein said fiber includes a silica based core doped with at least two of: Ge (Germanium), Al (Aluminum), B (Boron).

18. The system of claim 14 wherein said fiber includes either a pure silica core or a silica based core doped with Ge(Germanium).

19. The system of claim 16 wherein said fiber has birefringence of at least greater than $10^{-4}$.

20. The system of claim 19 wherein said fiber has birefringence of at least between $3 \times 10^{-4}$ and $8 \times 10^{-4}$ at 1550 nm.

21. The system of claim 14 wherein said at least one optical fiber has an effective area Aeff of less than 70 $\mu m^2$ at 1550 nm.

22. The system of claim 21 wherein said at least one optical fiber has an effective area Aeff of 40 $\mu m^2$ to 70 $\mu m^2$ at 1550 nm.

23. The system of claim 21 wherein said at least one optical fiber has at least two Brillouin peaks that have similar amplitudes, such that the amplitude of one of said Brillouin peaks is within 70% to 130% of the amplitude of the other Brillouin peak.

24. The system of claim 21 wherein said at least one optical fiber has at least two Brillouin peaks that have similar amplitudes, such that the amplitude of one of said Brillouin peaks is within 85% to 115% of the amplitude of the other Brillouin peak.

25. A method of simultaneously determining strain and temperature characteristics of an object comprising the steps of:
   providing a single optical fiber having at least two Brillouin peaks;
   (ii) determining coefficients of strain and temperature for said optical fiber;
   (iii) securing said single optical fiber to said object along a length thereof with at least one connector;
   (iv) inputting, laser light provided by a laser into said optical fiber at the other ends thereof;
   (v) measuring the at least two Brillouin peak frequencies for said optical fiber; and
   (vi) utilizing an electronic device to calculate strain and temperature characteristics based on the coefficients of strain and temperature and the measured Brillouin frequencies for said optical fiber.

* * * * *